Jan. 23, 1973   P. A. GARTAGANIS ET AL   3,712,843
METHOD AND APPARATUS FOR PRODUCING CORRUGATED BOARD
Filed Dec. 7, 1970   2 Sheets-Sheet 1

FIG. I

INVENTORS
Phoebus A. GARTAGANIS
Denis Michael HARVEY

PATENT AGENT

United States Patent Office 3,712,843
Patented Jan. 23, 1973

3,712,843
METHOD AND APPARATUS FOR PRODUCING CORRUGATED BOARD
Phoebus A. Gartaganis, Beaconsfield, and Denis Michael Harvey, Baie d'Urfe, Quebec, Canada, assignors to Domtar Limited, Montreal, Quebec, Canada
Filed Dec. 7, 1970, Ser. No. 95,599
Int. Cl. B30b 15/34; B32b 31/20
U.S. Cl. 156—499  4 Claims

ABSTRACT OF THE DISCLOSURE

In this method of making corrugated board the board formed by the application of the liner to the single-face is passed between two metal surfaces, both heated to a suitable temperature. The temperature of the metal surface in contact with the liner is about the same as, or preferably somewhat higher than, the temperature of the other metal surface. In a corresponding apparatus the surface applying heat to the single-face is constituted by an endless moving metal belt, e.g. made of fatigue-resistant rolled spring steel.

FIELD OF THE INVENTION

The present invention relates to the manufacture of corrugated board, more particularly to a method and apparatus for the forming of a corrugated board substantially free from warp.

DESCRIPTION OF THE PRIOR ART

In the manufacture of corrugated boards as now practiced, a so-called single-face, consisting of a liner laminated to a corrugated medium, is first formed, and then a second liner is applied to the opposite side of the corrugated medium and secured by adhesive to the tips of the flutes of the said medium. The adhesive is set by heat which is applied to the second liner, e.g. by means of a hot plate, while the laminated board is held at a preset pressure, e.g. by means of a belt applied to the single-face side. This application of heat from one side only, i.e. from the second liner side, drives water from the starch adhesive and from the second liner into the single-face (and into the first liner forming part of the single-face). Such a migration of water from the second liner to the first liner produces very often, and particularly when the speed of the corrugator is low, a water imbalance between the two liners during the process of combination, which in turn produces a warp in the final board.

It is an object of the present invention to provide a new method and apparatus for the making of corrugated board whereby to substantially reduce warp in the corrugated board.

SUMMARY OF THE INVENTION

Broadly, the present invention provides an apparatus for making corrugated board comprising: means for applying a liner to a single-face to form a laminate, a first heat-conductive metal surface and a second heat-conductive metal surface parallel to said first surface, said first surface and said second surface defining a pressure zone therebetween, means for moving said laminate through said zone in face-to-face contact with said first surface and with said second surface thereby to obtain good heat transfer between said surfaces and said laminate, and means for heating said first surface and said second surface.

The present invention also provides a method of making corrugated board comprising applying a liner to the preglued flutes of a single-face to form a laminate, pressing said laminate between first and second heat conducting surfaces, the first surface being in face-to-face contact with the liner side of said laminate and said second surface being in face-to-face contact with the opposite side of said laminate thereby to transfer heat directly from said surfaces to said liner side and said opposite side of said laminate to substantially balance the moisture contents of said sides, the first surface being maintained at an average temperature above 300° F. but below the charring temperature of the liner and said second surface having an average temperature such that the average temperature of said first surface minus the average temperature of said second surface is between 150 and −50° F.

BRIEF DESCRIPTION OF THE DRAWING

Further features, objects and advantages will be evident from the following description taken in conjunction with the accompanying drawings in which.

DESCRIPTION OF THE PREFERRED EMBODIMENTS

The term "radius of warp" $R_w$ as used herein denotes the radius of curvature of the warped board, measured in inches, in the cross-machine direction, i.e. the direction of the flutes. The inverse of the radius of warp ($1/R_w$) will be taken herein as a measure of warp; thus when the radius of curvature is 50 inches, the corresponding warp is 0.02. When the warp is such that the free ends of the board turn upwards (away from the plane of the second liner), the warp will be designated as negative, and in the opposite case as positive.

Figure 1:
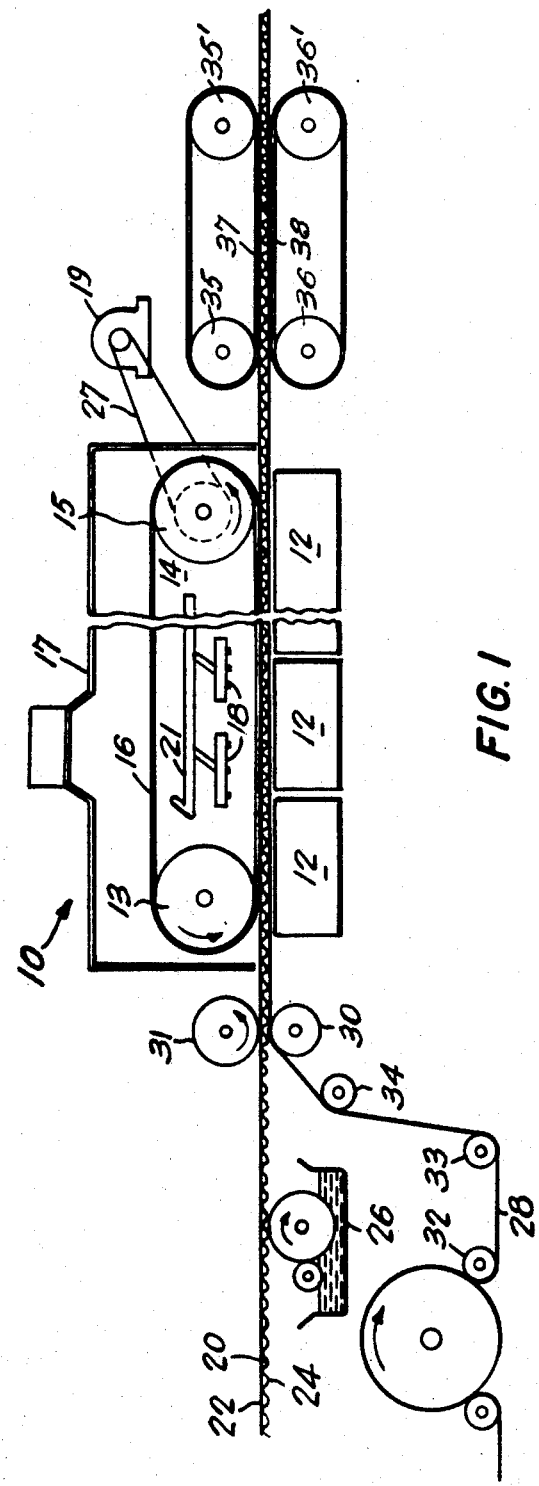
FIG. 1 is a view, partly diagrammatic, illustrating a corrugator of the present invention.

In FIG. 1 the preferred form of apparatus for carrying out the present invention has been schematically illustrated; other forms will be evident as the disclosure proceeds. In FIG. 1, numeral 10 denotes generally the double facer section of the corrugator, which contains, in addition to the conventional hot plates 12 for heating the liner side, a second heating and pressure means 14 adapted to apply heat and pressure to the combined board from the single-face side. In the illustrated embodiment the heating and pressure means 14 comprises metal belt 16 heated by a suitable heater 18. The belt 16 is adapted to evenly distribute heat and pressure over the surface of the board and consists preferably of a continuous impervious metal belt, e.g. an endless moving belt made of fatigue-resistant, flexible, rolled spring steel. An example of such belt is one made of specially trued rolled spring steel, hardened and tempered, of a hardness 36–38 Rockwell, and containing, in percent, .56 C, .27 Si, .37 Mn, .17 Cr, .03 P and .02 S. The belt 16 is driven by roll 15 in the direction indicated, roll 15 being connected to electric motor 19 by means of a suitable transmission mechanism shown on the drawing as belt 27. Heater 18 is a gas heater connected to a source of gas (not shown) by means of gas pipe 21. Heating and pressure means 14 are enclosed by hood 17 which is provided with venting means for the removal of the combustion gases. Hood 17 is removable to permit access to heating and pressure means 14 when necessary. Instead of the single belt 16, twin metal belts of lesser width can be used; also instead of a stationary plate and a moving belt it is possible to have two parallel moving belts or two stationary plates. Different heating means can be used; and the heat may be applied to the upper run of belt 16, or to the lower, or to both; belt 16 can also be heated, e.g. by contact with rolls 13 or 15.

As the single-face 20, composed of top liner 22 and corrugating medium 24, is fed towards the double-facer section, adhesive is applied to the tips of the flutes of the corrugated medium by adhesive applying means 26. The second liner 28 is brought around rolls 32, 33 and 34, and placed in contact with the tips of the corrugations of the single-face 20 by means of roll 30 and rider roll 31. The laminate thus formed from a combination of liner 28 and single-face 20 is moved through the pressure zone between hot plates 12 and heated belt 16, where it is pressed together and heated from both sides, so as to set the adhesive and dry the laminate, thereby to form a combined corrugated board.

On leaving the pressure zone the combined corrugated board passes between belts 37, 38, made of rubber, canvas or the like, and travels on pairs of rollers 35, 35' and 36, 36' respectively, the belts providing the necessary traction for the movement of board through the machine. The combined board, on leaving the heating section, may be processed in the normal manner. Preferably the combined board is cut and scored while it is still hot, i.e. immediately upon leaving belts 37, 38.

We have found that to produce a combined corrugated board with an acceptable radius of curvature at the usual speeds of travel of the board through the machine, the surface temperature $T_1$ of the bottom plate, i.e. the surface in contact with the second liner, should be above 300° F. (but of course, below the charring temperature of the liner); while the surface temperature $T_2$ of the surface in contact with the single-face should differ from $T_1$, if at all, by a relatively small amount. We have found that the difference $T_1$ minus $T_2$ should be within the range of 150° F. to —50° F. and preferably between 75° F. and 0. By heating the combined board in the manner stated above, the moisture content of the top and bottom liners will be substantially balanced. In the case of a very unusual moisture distribution, e.g. when the single-face or the second liner has an unusually high moisture content, absolutely or relative to each other, it may be desirable to pre-condition the single-face or the liner or both, e.g. by means of heaters placed in the line of travel of the respective component so that if the discrepancy between the moisture contents of these elements is too great it can be removed before they enter the double-facer.

In the above description the difference in temperatures $T_1$ and $T_2$ are based on maintaining $T_1$ or $T_2$ substantially constant. It is apparent that the belt or the bottom hot plate may be preheated to a higher temperature and cooled as it progresses in contact with the board rather than having heat applied to these surfaces over their total area of contact to hold the surfaces at substantially constant temperature. In the former case the temperature of these surfaces will reduce, depending on their time in contact with the board but, in any event, sufficient heat will be transferred to balance the moisture contents of the top and bottom liners and of course to gel the adhesive so that an acceptable board is formed.

Throughout the disclosure when the temperature difference between the two surfaces, i.e. $T_1$ and $T_2$, is given in degrees Fahrenheit, it is assumed that this is the average temperature and that the input and output temperatures of the belt are such as to transfer the required amount of heat as outlined above. Thus, when the disclosure and claims specify 150 to —50° F. or 75 ° to 0° F., this is intended to include operation wherein the surfaces may or may not be maintained at the same temperature but wherein the required degree of heat transfer is obtained.

EXAMPLES

Combined corrugated board was made in a pilot machine according to this invention substantially as illustrated in FIG. 1. The hot plate forming the lower heating and pressure surface was of an overall length of 16 feet and the steel belt forming the upper surface extended substantially over the same length. The board was 14" wide and the operating speed (except where otherwise stated) was approximately 150 ft./min. A great number of runs have been carried out in varying conditions, notably in respect of temperature difference between the plate and the belt, basis weight of the liners, moisture content, etc. Examples of these runs are as follows:

(I) Basis weight first liner (single-face) and second liner 37½ lbs./M s.f.
Moisture content single-face and second liner 7%.
Hot plate at constant temperature ($T_1$) of 350° F.

The belt temperature ($T_2$) was increased in steps from about 180° F. to 310° F. and then allowed to cool in steps to 220° F., while the board was run through the machine to provide samples at various temperatures of the belt. The combined board was collected in separate groups of samples according to the belt temperature and tested for warp after 24 hours conditioning at a fixed relative humidity.

| Hot plate ($T_1$) | Belt temperature ($T_2$) | $T_1-T_2$ | Warp (l/$R_W$) |
|---|---|---|---|
| Degree | Degree | Degree | |
| 350 | 180 | 170 | —0.017-—0.011 |
| 350 | 200 | 150 | —0.017-—0.011 |
| 350 | 250 | 100 | —0.007-—0.005 |
| 350 | 290 | 60 | —0.004 |
| 350 | 310 | 40 | 0.0 |
| 350 | 250 | 100 | —0.007-—0.005 |
| 350 | 240 | 110 | —0.007-—0.005 |

(II) Basis weight first and second liner 42 lbs./M s.f.
Moisture content single-face 7%, second liner 4.5%.
Hot plate ($T_1$) at 350° F. The belt temperature ($T_2$) varied from 190° F. to 360° F.

| Hot plate ($T_1$) | Belt temperature ($T_2$) | $T_1-T_2$ | Warp (l/$R_W$) |
|---|---|---|---|
| Degree | Degree | Degree | |
| 350 | 190 | 160 | —0.011-—0.007 |
| 350 | 260 | 90 | —0.005 |
| 350 | 300 | 50 | —0.003-—0.005 |
| 350 | 330 | 20 | 0.0 |
| 350 | 350 | 0 | 0.0 |
| 350 | 360 | —10 | 0.0 |

(III) Basis weight first liner 26 lbs./M s.f., second liner 42 lbs./M s.f.
Moisture content single-face and second liner 7%.
Hot plate ($T_1$) at 350° F. Belt temperature ($T_2$) varied from 180° to 340°.

| Hot plate ($T_1$) | Belt temperature ($T_2$) | $T_1-T_2$ | Warp (l/$R_W$) |
|---|---|---|---|
| Degree | Degree | Degree | |
| 350 | 180 | 170 | —0.01-—0.017 |
| 350 | 235 | 115 | —0.007-—0.01 |
| 350 | 270 | 80 | —0.005-0.0 |
| 350 | 300 | 50 | —0.003-0.0 |
| 350 | 320 | 30 | 0.0 |
| 350 | 340 | 10 | 0.0-+0.007 |

(IV) Basis weight and moisture content as in III.
Hot plate ($T_1$) at 366° F.

| Hot plate ($T_1$) | Belt temperature ($T_2$) | $T_1-T_2$ | Warp (l/$R_W$) |
|---|---|---|---|
| Degree | Degree | Degree | |
| 366 | 270 | 96 | —0.003-0.0 |
| 366 | 290 | 76 | 0.0-+0.003 |
| 366 | 310 | 56 | 0.0-+0.005 |
| 366 | 330 | 36 | 0.0-+0.005 |
| 366 | 340 | 26 | +0.005-+0.01 |
| 366 | 360 | 6 | +0.005-—0.01 |

(V) Basis weight first and second liner 26 lbs./M.s.f.
Moisture content single-face and second liner 7%.
Hot plate ($T_1$) at 320° F.
Speed varying between 135 and 300 ft./minute.

| Hot plate ($T^1$) | Belt temperature ($T^2$) | $T^1-T^2$ | Speed (ft./minutes) | Warp ($1/R_W$) |
|---|---|---|---|---|
| Degree | Degree | Degree | | |
| 320 | 220 | 100 | 140 | −0.012−−0.007 |
| 320 | 260 | 60 | 140 | −0.005−0.0 |
| 320 | 300 | 20 | 140 | 0.0−+0.003 |
| 320 | 300 | 20 | 205 | 0.0 |
| 320 | 300 | 20 | 260 | −0.003−0.0 |
| 320 | 300 | 20 | 300 | −0.003 |
| 320 | 325 | −5 | 135 | 0.0−+0.007 |
| 320 | 325 | −5 | 205 | +0.003−+0.005 |
| 320 | 350 | −30 | 135 | 0.003−0.005 |
| 320 | 350 | −30 | 205 | 0.003−0.005 |

Figure 2:
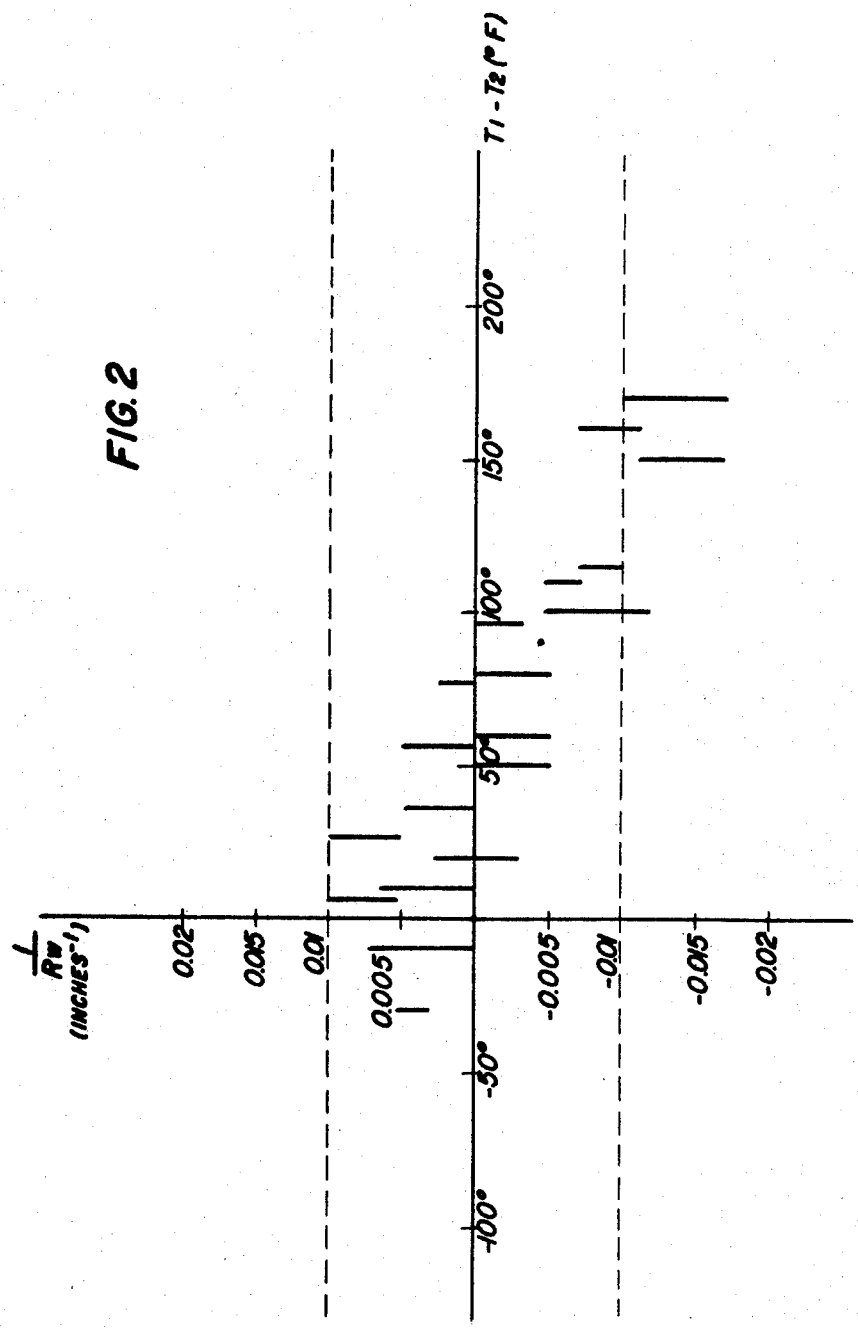
FIG. 2 is a graph illustrating the variation of the radius of warp as a function of the difference between temperatures applied respectively to the liner and single-face side of the laminate, in a substantial number of runs, in a corrugator of the present invention.

The results of these runs are represented diagrammatically on FIG. 2. If a conventional norm for acceptability of warp is set between −0.01 and +0.01 (as is quite commonly the case in practice), it will be seen from the above that when the second liner is applied to the single-face according to the invention, the resulting board will have a warp which will be within the acceptable range. In the overwhelming majority of cases, and for a great variety of basis weight, speed of operation, temperature of hot plate and moisture content of liners, the inverse of the radius of curvature will be within the range of −0.01 to +0.01 when the difference in temperature between the plate and the belt (i.e. $T_1-T_2$) is in the range from 150° to −50°, and preferably between 75° and 0. When the temperature $T_1$ of the hot plate exceeded the belt temperature $T_2$ by more than 150° F. the tendency was clearly toward an increase in warp (i.e. smaller radius of curvature). Similarly, when the temperature of the belt $T_2$ exceeds substantially the temperature of the hot plate (i.e. for $T_1-T_2$ negative and of substantial magnitude), the radius of curvature decreases (i.e. warp increases), though the curvature is now in a different direction, as indicated by the plus sign, the free edges of the boards turning downwards rather than as "normally" upwards.

It will be appreciated that what is an acceptable degree of warp and what is not may vary somewhat according to manufacturer, grade, or market acceptance. Whatever particular limits are set as the norm for acceptability, the present invention teaches a method of minimizing warp and of achieving such norm.

What is claimed is:

1. An apparatus for making substantially warp free corrugated board comprising means for applying a liner to a single face to form a corrugated board, a heat conducting surface for applying heat directly to said liner, a heat conducting belt cooperating with said heat conducting surface and defining a pair of planar surfaces which form a pressure zone therebetween, means to drive said belt to advance said board through said pressure zone, means to heat said heat conducting surface and means to heat said belt, said belt and said heat conducting surface being arranged in said pressure zone to directly contact in intimate face-to-face relationship opposite sides of said laminate respectively thereby to transfer heat from said surface and said belt to said board and substantially prevent the escape of moisture from either surface of said board and means to control the heat applied by said belt and said surface to substantially balance the moisture content of said liner and of the liner forming part of the single face thereby to produce a substantially warp free corrugated board.

2. An apparatus as defined in claim 1 wherein said belt is impervious.

3. The apparatus of claim 1 wherein said heat conducting surface is constituted by an endless moving metal belt.

4. The apparatus of claim 3 wherein said belts are of fatigue-resistant rolled spring steel.

References Cited

UNITED STATES PATENTS

| 1,179,941 | 4/1916 | Langston | 156—583 |
| 2,182,358 | 12/1939 | Sherts et al. | 156—499 |
| 2,429,482 | 10/1947 | Munters | 156—582 |
| 3,586,574 | 6/1971 | Soda et al. | 156—499 |

W. J. VAN BALEN, Primary Examiner

U.S. Cl. X.R.

151—583; 156—582